(12) United States Patent
Nader et al.

(10) Patent No.: US 12,726,899 B2
(45) Date of Patent: Sep. 1, 2026

(54) EFFICIENT USAGE OF RECEIVERS FOR PAGING-EARLY-INDICATION RECEPTION

(71) Applicant: Telefonaktiebolaget LM Ericsson (publ), Stockholm (SE)

(72) Inventors: Ali Nader, Malmö (SE); Sina Maleki, Malmö (SE); Andres Reial, Höllviken (SE); Niklas Andgart, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 18/681,722

(22) PCT Filed: Aug. 16, 2022

(86) PCT No.: PCT/IB2022/057679

§ 371 (c)(1),
(2) Date: Feb. 6, 2024

(87) PCT Pub. No.: WO2023/021426

PCT Pub. Date: Feb. 23, 2023

(65) Prior Publication Data

US 2025/0142470 A1 May 1, 2025

Related U.S. Application Data

(60) Provisional application No. 63/233,680, filed on Aug. 16, 2021.

(51) Int. Cl.
*H04W 52/02* (2009.01)
*H04W 68/02* (2009.01)

(52) U.S. Cl.
CPC ....... *H04W 52/0209* (2013.01); *H04W 68/02* (2013.01)

(58) Field of Classification Search
CPC ............. H04W 52/0209; H04W 68/02; H04W 52/0216; H04W 52/0235; Y02D 30/70
See application file for complete search history.

(56) References Cited

U.S. PATENT DOCUMENTS

2016/0128128 A1* 5/2016 Ang ...................... H04W 76/28 370/311
2018/0020501 A1* 1/2018 Aboul-Magd ...... H04L 27/2602
(Continued)

FOREIGN PATENT DOCUMENTS

WO 2018192746 A1 10/2018

OTHER PUBLICATIONS

MediaTek Inc., "Design of paging early indication for idle/inactive-mode UE power saving", R1-2100591,3GPP TSG RAN WG1 #104 -e, Jan. 25-Feb. 5, 2021 (Year: 2021).*
(Continued)

*Primary Examiner* — Ayaz R Sheikh
*Assistant Examiner* — Tarell A Hampton
(74) *Attorney, Agent, or Firm* — Murphy, Bilak & Homiller, PLLC

(57) ABSTRACT

The efficient usage of receivers for paging-early-indication (PEI) reception in a user equipment (UE) is described. The UE determines to use a wake-up receiver (WUR) as the primary receiver for monitoring PEO when waking up in Discontinuous Reception (DRX). The WUR consumes less power than a main receiver of the UE. The UE detects, at the WUR, a PEI and activates the main receiver of the UE for monitoring a paging occasion (PO). Responsive to determining that a condition for using the WUR as the primary receiver for monitoring PEI when waking up in DRX is not satisfied, the UE switches to using the main receiver as the primary receiver for monitoring PEI when waking up in DRX and not using the WUR for monitoring PEI.

12 Claims, 7 Drawing Sheets

(56) References Cited

U.S. PATENT DOCUMENTS

2018/0098287 A1* 4/2018 Ang .................. H04W 52/0229
2018/0183905 A1* 6/2018 Azizi ...................... H04L 27/02
2018/0184378 A1* 6/2018 Fang ..................... H04L 5/0007
2018/0310249 A1* 10/2018 Wilhelmsson .... H04W 52/0241
2019/0045477 A1* 2/2019 Edge ................... H04W 64/003
2019/0313338 A1* 10/2019 Wilhelmsson .... H04W 52/0229
2020/0145921 A1* 5/2020 Zhang ............... H04W 52/0235
2020/0154355 A1* 5/2020 Nam ................. H04W 52/0229
2020/0367199 A1* 11/2020 Bhatoolaul ........... H04W 72/23
2021/0168716 A1* 6/2021 Mi ........................ H04W 68/02
2021/0344542 A1* 11/2021 Mazloum .............. H04L 5/0051
2021/0392582 A1* 12/2021 Chen ..................... H04W 76/28
2022/0225237 A1* 7/2022 He .................... H04W 72/0446
2022/0322235 A1* 10/2022 Odelberg .............. H03F 3/3022
2022/0386409 A1* 12/2022 Koskela ............ H04W 52/0229
2023/0032154 A1* 2/2023 Hwang ................. H04L 5/0053
2023/0189139 A1* 6/2023 Priyanto ........... H04L 27/26025
370/311
2023/0388968 A1* 11/2023 Yang ................... H04W 68/025
2024/0039669 A1* 2/2024 Koskela ................ H04L 5/0094
2024/0057034 A1* 2/2024 Shrivastava .......... H04W 68/02
2024/0147424 A1* 5/2024 Xue ...................... H04W 68/02
2024/0187187 A1* 6/2024 Jung ..................... H04L 5/0051
2024/0259998 A1* 8/2024 Peng .................... H04B 7/0626
2024/0284456 A1* 8/2024 Elkotby ................ H04W 76/19
2024/0306125 A1* 9/2024 Zhou ................. H04W 52/0216
2024/0365282 A1* 10/2024 Wu ..................... H04W 68/005
2024/0381307 A1* 11/2024 Reial ................... H04W 68/005

OTHER PUBLICATIONS

Apple Inc., "Paging early indication for idle/inactive-mode UE", R1-2101392, 3GPP TSG RAN WG1 #104-e, Jan. 25-Feb. 5, 2021 (Year: 2021).*

"Design of Paging Early Indication for Idle-Mode UE Power Saving Document for: Discussion and Decision", 3GPP TSG RAN WG1 #106-e, R1-2107519, e-Meeting, MediaTek Inc., Aug. 16-27, 2021, 11 pages.

* cited by examiner

WUR IS USED AS PRIMARY RECEIVER

WUR USED

CHECKING HOW OFTEN PEI PRESENCE IS DETECTED, BUT WHEN MAIN RECEIVER IS INVOKED AND PO DECODED, UE WAS NOT PAGED

205

FALSE PAGING RATE >= THRESHOLD? (E.G.,WUR FALSE PAGING RATE THRESHOLD)

YES

NO

CHANGE STATE TO MAIN RECEIVER USED AS PRIMARY RECEIVER

210

END

EFFICIENT USAGE OF RECEIVERS FOR PAGING-EARLY-INDICATION RECEPTION

CROSS-REFERENCE TO RELATED APPLICATIONS

This application claims the benefit of U.S. Provisional Application No. 63/233,680, filed Aug. 16, 2021, which is hereby incorporated by reference.

TECHNICAL FIELD

Embodiments of the invention relate to the field of user equipment; and more specifically, to the efficient usage of receivers for paging-early-indication (PEI) reception.

BACKGROUND

Idle/inactive (NR RRC_IDLE/RRC_INACTIVE) Discontinuous Reception (DRX) is a key energy saving mechanism allowing a User Equipment (UE) to remain in deep sleep a dominant fraction of the time when no data transmission is ongoing. DRX operation by a UE entails mainly periodical paging monitoring in case the network (NW) aims to reach the UE and Radio Resource Management (RRM) measurements to determine the optimal serving cell. The NW configures the UE with a DRX period that determines the paging monitoring rate; typically, RRM measurements are performed at same rate.

For the sake of paging decoding, the UE typically needs to wake up ahead of each paging occasion and perform time/frequency corrections based on synchronization signals such as NR Synchronization Signal Blocks (SSB) and thereby be prepared for proper reception of a potential paging message on the Physical Downlink Shared Channel (PDSCH) channel. Different number of synchronization signals (e.g., SSBs) may need to be processed by the UE before PDSCH reception depending on UE perceived coverage. For example, a UE in poor coverage (e.g., low signal-to-interference-plus-noise ratio (SINR), Reference Symbol Received Power (RSRP) (or sometimes referred to as Reference Signal Received Power), Reference Signal Received Quality (RSRQ) (or sometimes referred to as Reference Symbol Received Quality), etc.) may need to process up to 3 SSBs ahead of potential PDSCH, whereas for a UE in good coverage a single SSB may be enough.

As the UE typically is not paged by the NW at every single DRX occasion, many of the said SSBs are received and processed in vain causing unnecessary energy consumption for the UE. A typical paging rate for a Paging Occasion (PO) shared by multiple UEs is ~10%, i.e., only 10% of the time, there is a PDSCH message to be decoded by the UE. Furthermore, not necessarily the decoded paging message is aimed for the specific UE that decoded it. Since multiple UEs share the same PO, only if the identity of the UE is present in the paging message (PDSCH), the specific UE has been paged. Otherwise, the UE that decoded the message without finding its identity in it has been so called falsely paged. 3GPP has therefore agreed to introduce a tool called Paging Early Indication (PEI). The idea is that the NW transmits a PEI ahead of the actual paging occasion. The design of the PEI is such that the UE need not process as many synchronization signals as for PDSCH reception to receive the PEI. If PEI is present, it is meant that there will be a PDSCH message further ahead and the UE can then process more synchronization signals before processing the PDSCH. Otherwise, the UE can immediately go back to sleep. As described herein, it is assumed that the PEI is a Downlink Control Information (DCI) transmitted on the Physical Downlink Control Channel (PDCCH). Furthermore, the PEI may carry more information such as paging sub-group information. Only if the UE belongs to the indicated sub-group, the UE needs to process the PDCCH/PDSCH at the intended PO. PEI may also carry other information such as availability of Tracking Reference Signal (TRS), etc.

Some UE implementations may be equipped with a low power receiver referred herein as a Wake-Up Receiver (WUR). If the PEI design allows, the WUR may provide sufficient reception quality for detecting presence of PEI. For example, the PEI design may be such that that its PDCCH is transmitted with a specific/distinguishable Demodulation Reference Signal (DMRS) whereby the WUR would search for such matching DMRS sequence rather than actual decoding of the PEI content. Or, for example, PEI may be designed such that it is transmitted over specially assigned PEI time/frequency resources reserved for PEI only whereby a WUR would detect it by energy detection in those resources. If the WUR detects a PEI, it activates the main receiver in good time ahead of PO for synchronization and PDCCH/PDSCH processing during the PO. The WUR may activate the main receiver using an interrupt mechanism. For example, the WUR can generate an interrupt to a micro-controller (MCU) or main processor (MPU) hosting a switch logic. The MCU or MPU then switches the main receiver from sleep to an active mode.

As an alternative to the above description when the existence of a PEI indicates an upcoming paging message (called positive PEI, or behavior A), the opposite behavior of PEI can also be defined (called negative PEI, or behavior B). Then, the UE would in absence of PEI try to decode the paging PDSCH, and could after detection of PEI instead go back to sleep. What interpretation to use can be a static setting or can be configurable.

There currently exist certain challenge(s) with existing techniques. Even though a low power receiver such as WUR may be used to detect PEI presence, it may not be able to decode its contents if the PEI is DCI/PDCCH based containing a relatively complex data structure. It might be so that decoding the contents via a main receiver and utilizing the information within PEI may help the UE to save even more energy compared to WUR in certain scenarios. Hence, there is a balance between when to use the WUR contra the main receiver and how much energy savings can be achieved.

SUMMARY OF THE INVENTION

Efficient usage of receivers for paging-early-indication (PEI) reception is described. In one aspect a method is performed by a user equipment (UE) for efficient usage of a main receiver and a wake-up receiver (WUR) for paging-early-indication (PEI) reception, the method including determining to use the WUR as a primary receiver for monitoring PEI when waking up in Discontinuous Reception (DRX), where the WUR consumes less power than the main receiver; detecting, at the WUR, a PEI; responsive to the detecting the PEI, the WUR activating the main receiver for monitoring a paging occasion (PO); determining that a condition for using the WUR as the primary receiver for monitoring PEI when waking up in DRX is not satisfied; and responsive to the determining that the condition for using the WUR as the primary receiver for monitoring PEI when waking up in DRX is not satisfied, switching to using the main receiver as the primary receiver for monitoring PEI when waking up in DRX and not using the WUR for monitoring PEI. The method may further include adjusting one or more thresholds for the condition based on information included in the PEI. The information included in the PEI may include one or more of paging sub-group information and Tracking Reference Signal (TRS) presence information. The method may further include recording the received PEI and feeding the received PEI to the main receiver after activating the main receiver, where the main receiver demodulates the received PEI. The method may further include determining that the demodulated PEI indicates no paging for the UE, and responsive to this determination, ignoring decoding the paging occasion. The method may further include, while the main receiver is the primary receiver for monitoring PEI when waking up in DRX, determining that a condition for using the WUR as the primary receiver for monitoring PEI when waking up in DRX is satisfied, and responsive to this determination, switching to using the WUR as the primary receiver. The condition may be based on at least one of a group paging rate, UE specific paging rate, PEI rate, false paging rate, latency constraint, quality of the channel, or any combination thereof. Determining to use the WUR as the primary receiver for monitoring PEI when waking up in DRX may be based on channel quality being greater than a channel quality threshold. Determining to use the WUR as the primary receiver for monitoring PEI when waking up in DRX may be where a false alarm rate is below a false alarm rate threshold, where a false alarm is where the WUR falsely detects presence of PEI and activates the main receiver even though there is no paging message at an upcoming paging occasion. The step of detecting, at the WUR, the PEI may include determining a presence of a specific Demodulation Reference Signal (DMRS) associated with the UE that is a Downlink Control Information (DCI) included on the Physical Downlink Control Channel (PDCCH). The WUR may not be capable of decoding contents of the PEI.

In further aspects, one or more embodiments of a non-transitory computer-readable medium or distributed media containing computer-executable program instructions or code portions stored thereon are disclosed for performing one or more embodiments of the methods of the present invention when executed by a processor entity of an apparatus, an electronic device, or other computing device. Further features of the various embodiments are as claimed in the dependent claims.

BRIEF DESCRIPTION OF THE DRAWINGS

The invention may best be understood by referring to the following description and accompanying drawings that are used to illustrate embodiments of the invention. In the drawings.

DETAILED DESCRIPTION

Efficient usage of receivers for paging-early-indication (PEI) reception is described. Embodiments herein describe logic for switching between the main receiver and WUR for achieving optimal energy consumption. For example, in some scenarios the UE may save more energy by decoding the contents of a PEI using the main receiver as compared to WUR. Hence, there is a balance between when to use the WUR contra the main receiver and how much energy savings can be achieved.

Figures 1, 2:
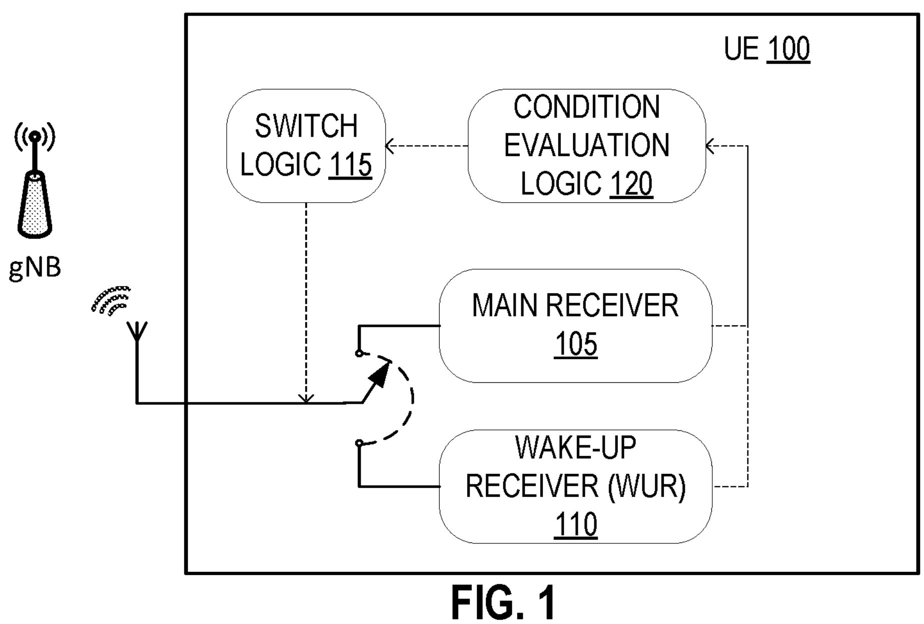
FIG. 1 is a receiver diagram for a UE that has efficient usage of a main receiver and a wake-up receiver for PEI reception according to an embodiment.
FIG. 2 shows an exemplary flowchart for when the UE uses the WUR as the primary receiver and the UE switches to using the main receiver as the primary receiver according to an embodiment.

FIG. 1 is a receiver diagram for a UE 100 that has efficient usage of the main receiver 105 and the wake-up receiver 110 for PEI reception according to an embodiment. The UE 100 is equipped with two receivers: a main receiver 105 and a low power wake-up receiver (WUR) 110. The WUR 110 can only detect PEI presence, not decode its contents. For example, PEI design is such that through WUR 110, the presence of PEI can be detected (e.g., DMRS distinguishable) but its contents are too complex to be demodulated with WUR 110. The UE 100 includes the switch logic 115 that includes logic for switching between the main receiver 105 and WUR 110. For example, the switch logic 115 may receive an interrupt that then switches between the main receiver 105 and the WUR 110.

Depending on various scenarios, it may be more efficient to use the main receiver 105 instead of the WUR 110 since the PEI contents may be valuable enough to save UE energy consumption despite reception via the main receiver 105. The UE 100 includes the condition evaluation logic 120 that is coupled with the main receiver 105, WUR 110, and the switch logic 115. The condition evaluation logic 120 may be implemented through an MCU or MPU and receive input from the main receiver 105 and/or the WUR 110. Based on UE energy consumption when employing a first or a second receiver as primary receiver when waking up in DRX, in conjunction with how much the content of PEI (e.g., paging sub-group info, TRS presence info) could help the UE to save energy at different circumstances (e.g., paging load, coverage, false paging rate, false alarm rate), the UE 100 chooses, through the condition evaluation logic 120, to operate with the main receiver 105 or the WUR 110 as the primary receiver.

In one aspect, when operating with WUR 110, the UE 100 records the PEI at or near the time of reception of PEI through the WUR 110. For example, the WUR 110 may record the PEI samples in a common memory accessible by the main receiver 105, the WUR 110, and the condition evaluation logic 120. The recorded PEI is then fed to the main receiver 105 when activated whereby the content of PEI is demodulated. In one embodiment, the PEI samples may be recorded in a common memory accessed by both the WUR 110 and the main receiver 105. Upon receiving the wake-up signal caused by the WUR 110, the main receiver 105 may read the samples from the common memory and perform PEI demodulation and decoding according to regular or appropriately modified procedures. If the contents of PEI indicate no paging for the UE 100 (e.g., UE sub-group is not indicated), the UE 100 ignores decoding the PDCCH/PDSCH of the PO. For example, if the main receiver 105 detects that the recorded PEI contents did not indicate this UE's sub-group, then the upcoming PO PDCCH/PDSCH does not need to be decoded and therefore the main receiver 105 can go back to sleep (ignoring the PO). The WUR can then again be activated for the next DRX cycle.

Certain embodiments may provide one or more of the following technical advantage(s). The proposed solution enables energy savings for UEs equipped with low power wake-up receivers.

It shall be noted that the ideas herein, even though exemplified for PEI reception in Idle/Inactive states, can be used for UEs equipped with WUR for any similar wake-up signal transmitted by the NW in any state where the wake-up signal even though detectable by WUR carry contents that are too complex to be understood by WUR and where a decoding via a main receiver would be necessary for content decoding.

As depicted in FIG. 1, the UE 100 is configured with a first receiver or so called the main receiver 105, and a second receiver, or so called WUR 110 to monitor PEI. The UE 100 is additionally configured with a DCI based PEI where the DCI is associated with a first DMRS. Furthermore, the UE 100 consumes less power in the second receiver (WUR 110) than the first receiver (main receiver 105) to monitor/detect/decode presence of PEI. The WUR 110 may be a relatively simple receiver whereas the main receiver 105 may be a transceiver that is used for regular data exchange. In an embodiment, the main receiver 105 and the WUR 110 are two physically distinct receivers. The WUR circuitry power consumption may be a magnitude lower than the main receiver circuitry power consumption. In another embodiment, the main receiver 105 and the WUR 110 may be implemented in the same receiver but operating in different modes (e.g., a lower power mode for the WUR 110 functionality).

In an embodiment, the UE 100 decides to use the second receiver, WUR 110, to monitor PEI when waking up in DRX based on one or more conditions. The decision may be made through the condition evaluation logic 120 that receives input from the main receiver 105 and/or the WUR 110. If the WUR 110 detects PEI when operating as the primary receiver, the WUR 110 wakes the first receiver (main receiver 105) to monitor the PO. If the condition is not satisfied, the UE 100 uses the first receiver, main receiver 105, to detect/decode PEI. Thus, the WUR 110 is used as the primary receiver for monitoring PEI when waking up in DRX under certain circumstance(s)/condition(s); otherwise the main receiver 105 is used as the primary receiver for monitoring PEI when waking up in DRX. When the main receiver 105 is used as the primary receiver for monitoring PEI and if PEI is received, the main receiver 105 monitors PO, and furthermore adjusts its receiver according to the potentially additional information in DCI payload, e.g., presence of additional non-SSB reference signals (e.g., TRS/CSI-RS presence), group paging info, etc. In case non-SSB reference signals are present, the UE 100 may use them instead or in addition to SSB(s) for synchronization, and thereby lower the wake-up time before the PO to lower the energy consumption. The UE 100 can also use the group paging information to understand if the PEI indicates the group that the UE 100 belongs to is paged or not and thus accordingly decide to monitor or not the PO.

The condition evaluation logic 120 can determine the following based on input from the main receiver 105 and/or the WUR 110, which can be used as condition(s) when determining which receiver to use as the primary receiver for monitoring PEI when waking up in DRX: group paging rate, UE specific paging rate, PEI rate, false paging rate, the latency constraint, the quality of the channel (e.g., RSRP, RSRQ, or SINR), or any combination thereof. The condition evaluation logic 120 can measure the paging/PEI rate, for example by monitoring the number of occasions where the UE is paged or received PEI in the last N (e.g., N=100) POs/PEI occasions. False paging rate means when the main receiver 105 monitors a PO, however its UE ID is not included in the paging PDSCH and thus the specific UE 100 is not paged in that PO. For instance, the main receiver 105 demodulates the content of the PDSCH and this demodulated content is input to the condition evaluation logic 120 and examined. If the condition evaluation logic 120 determines that the UE identity is missing in the PDSCH, then it determines that false paging has occurred. The main receiver 105 and/or the WUR 110 can measure attributes relative to signal quality (e.g., by measuring available reference signals such as SSB or TRS) and provide input to the condition evaluation logic 120 that can then estimate the quality of channel in terms of RSRP, RSRQ or SINR.

In one example, the condition evaluation logic 120 determines to use the second receiver, WUR 110, as the primary receiver when waking up in DRX if the channel quality (e.g., SINR), is above a first threshold (e.g., 0 dB). In this case, the WUR 110 receives PEI, and if, for example the associated DMRS is detected, then the WUR 110 wakes up the first receiver (main receiver 105) and the first receiver (main receiver 105) monitors the PO. When below said threshold, using the second receiver as the primary receiver (WUR 110) may lead to a larger false alarm rate than the first receiver (main receiver 105). Thus, the main receiver 105 may unnecessarily monitor PO and thus miss an opportunity for energy savings. Note that false alarm rate is different than false paging rate mentioned above. By false alarm, it is meant that the WUR 110 falsely detects presence of PEI and turns on the main receiver 105 even though there is no paging message (PDCCH/PDSCH) at the upcoming paging occasion. Alternately, or in conjunction with tracking the first threshold, the UE 100 only uses the second receiver (WUR 110) as the primary receiver where the false alarm rate is below a second false alarm threshold (e.g., 1%).

The condition evaluation logic 120 may adjust any of the said thresholds based on additional info. For example, if the condition evaluation logic 120 has become aware (e.g., by occasional decoding via the main receiver 105) that PEI currently indicates that non-SSB RSs such as TRS is available, the condition evaluation logic 120 may use a higher false alarm threshold (and thus use the main receiver 105 more often), while if TRS presence is not indicated in PEI, then the condition evaluation logic q20 can use a lower threshold. The reason is that if TRS is present and it is indicated in PEI (which the UE 100 cannot be aware of if it uses the second receiver (WUR 110)), then the UE 100 can potentially achieve power saving by using the additional TRS, and thus it makes sense that the UE 100 only uses the second receiver (WUR 110) for channel quality estimations which does not need the UE 100 to use multiple RSs before a PO for paging PDSCH decoding.

In another example, the UE 100 may be additionally configured with group paging. For instance, the UE 100 can be configured through higher layers or based on pre-configuration to be associated with a group. In such an example, the main receiver 105 monitors its PO only if it is, for example, indicated in PEI that the group that UE 100 belongs to is paged. Therein, the UE 100 can reduce the false paging and reduce energy consumption. Using the second receiver (WUR 110), the UE 100 may miss the info regarding the group paging, and thus during high false paging rates, the UE 100 employs the first receiver (main receiver 105) to determine if its own group is paged. As such in this example, the UE 100 decides to employ the first receiver (main receiver 105) if false paging rate is above a threshold, such as 10%.

Thus, the condition evaluation logic 120 can determine condition criteria based on input from the main receiver 105 and/or the WUR 110 (e.g., group paging rate, UE specific paging rate, PEI rate, false paging rate, latency constraint, and/or quality of channel), and determine how those condition criteria are used/applied when determining which of the main receiver 105 and the WUR 110 to set as the primary receiver for monitoring PEI when waking up in DRX. The condition evaluation logic may determine a subset of the criteria, their priority/order, the thresholds used, or any combination thereof.

Figure 3:
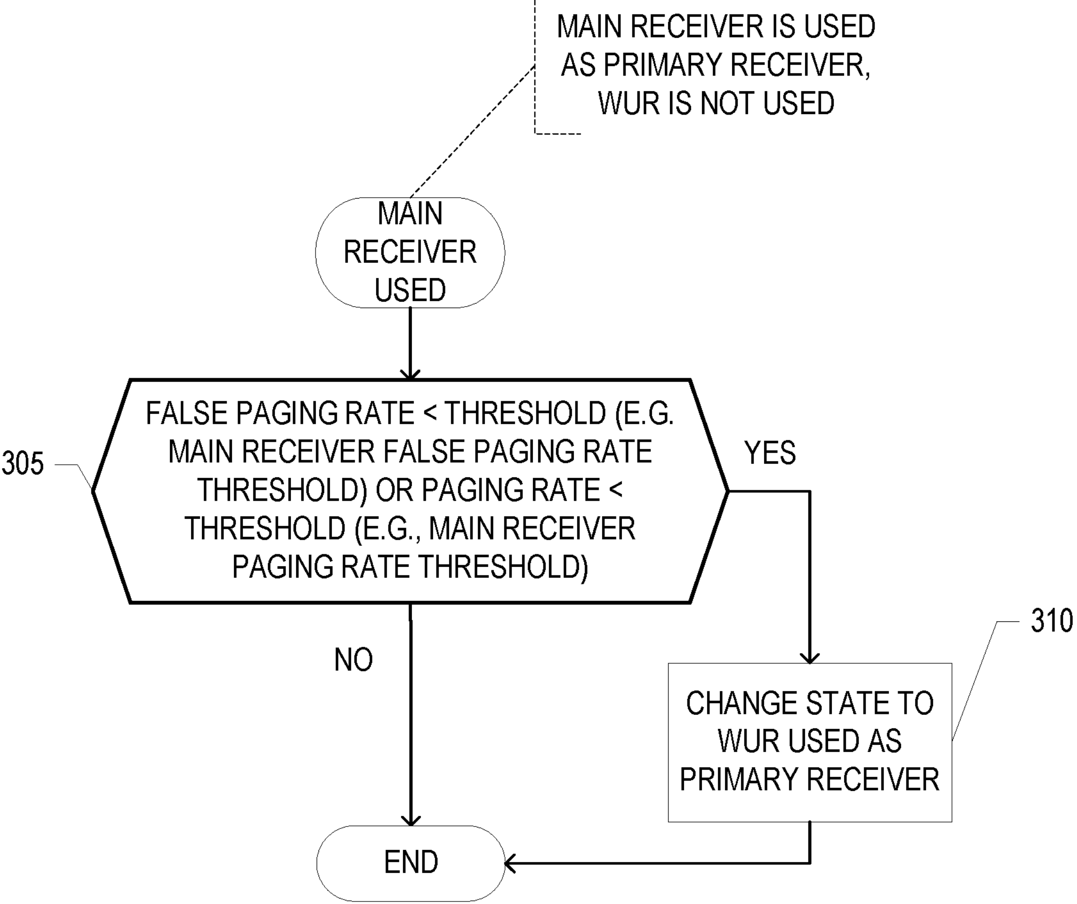
FIG. 3 shows an exemplary flowchart for when the UE uses the main receiver as the primary receiver and the UE switches to using the WUR as the primary receiver according to an embodiment.

Below is a list of exemplary operations the UE employs when operating with the first receiver (main receiver) or the second receiver (WUR) as the primary receiver upon wake up in DRX. FIGS. 2 and 3 show exemplary flowcharts for when the UE switches between states of using first (main receiver) or second receiver (WUR) as primary receiver. For instance, FIG. 2 shows an exemplary flowchart for when the UE uses the WUR as the primary receiver and the UE switches to using the main receiver as the primary receiver; and FIG. 3 shows an exemplary flowchart for when the UE uses the main receiver as the primary receiver and the UE switches to using the WUR as the primary receiver.

FIG. 2 shows an example where the WUR is being used as a primary receiver upon wake up in DRX. By way of example, the determined channel quality was above a channel quality threshold. The WUR 110 monitors a simple element in a potential PEI transmission such as the presence of PEI DMRS. If the simple element is detected, the WUR 110 wakes up the main receiver 105, and the main receiver 105 monitors PO regardless of PEI contents which may not be decoded. At operation 205, the condition evaluation logic 120 determines whether the false paging rate is greater than (or in some embodiments, greater than or equal to) a threshold (e.g., a WUR false paging rate threshold). The condition evaluation logic 120 checks how often PEI presence is detected, but when the main receiver 105 is invoked and PO decoded, the UE was not paged. The condition evaluation logic 120 causes the state to change to the main receiver 105 to be used as the primary receiver at operation 210 if the false paging rate is greater than the threshold (or in some embodiments, greater than or equal to the threshold).

Although FIG. 2 showed an example of the false paging rate being used as a condition, there are other ways of determining when to switch to using the main receiver 105 as the primary receiver.

For instance, in an embodiment, the condition evaluation logic 120 tracks PEI transmission rate (i.e., DMRS detection rate). The PEI transmission rate can be determined based on the fraction of POs of the UE (according to its idle (inactive DRX configuration)) for which PEI is detected. If this rate is greater than a PEI transmission rate threshold (many PO monitoring occasions means too much time out of deep sleep to make WUR gains significant), then the condition evaluation logic 120 causes the switch logic 115 to switch the primary receiver to the main receiver 105.

In another embodiment, the condition evaluation logic 120 tracks the UE individual paging rate based on PDSCH contents. The UE individual paging rate can be determined based on the fraction of POs of the UE (according to its idle (inactive DRX configuration) for which the UE is targeted in the paging PDSCH. If this rate is greater than a UE individual paging rate threshold (many NW connection occasions means too much time out of deep sleep to make WUR gains significant), then the condition evaluation logic 120 causes the switch logic 115 to switch the primary receiver to the main receiver 105.

In another embodiment, the condition evaluation logic 120 tracks the group paging rate based on paging PDCCH presence/group info. The group paging rate can be determined based on the fraction of POs of the UE (according to its idle (inactive DRX configuration)) for which the UE 100 is indicated in the paging PDCCH (DCI) to receive the paging PDSCH. This may differ from the PEI rate if additional grouping, not reflected in the PEI, is applied in the paging DCI. If this rate is greater than a group paging rate threshold (many paging PDSCH decoding occasions means too much time out of deep sleep to make WUR gains significant), then the condition evaluation logic 120 causes the switch logic 115 to switch the primary receiver to the main receiver 105.

In another embodiment, the condition evaluation logic 120 observes PEI SS BD size or tracks actual PEI location variations in T/F (where in T/F out of the SS options has DMRS been detected). If the condition evaluation logic 120 determines the variability is greater than a variability threshold (number of DMRS tests too large for WUR testing), then the condition evaluation logic 120 causes the switch logic 115 to switch the primary receiver to the main receiver 105.

FIG. 3 shows an example where the main receiver is being used as a primary receiver. In this example, the main receiver 105 is used as the primary receiver and the WUR 110 is not being used. The main receiver performs full PDCCH/DCI decoding and evaluates the contents of PEIs. If PEI payload indicates paging, the main receiver 105 monitors PO. At operation 305, the condition evaluation logic 120 determines whether the false paging rate is less than (or in some embodiments, less than or equal to) a threshold (e.g., a Main receiver false paging rate threshold); or whether the paging rate is less than (or in some embodiments less than or equal to) a threshold (e.g., a Main receiver paging rate threshold). If yes, the condition evaluation logic 120 causes the state to change to the WUR 110 being used as the primary receiver at operation 310. If no, the main receiver 105 continues to be used as the primary receiver.

Although FIG. 3 showed an example of the false paging rate or the paging rate being used as the condition, there are other ways of determining when to switch to using the WUR 110 as the primary receiver.

For instance, in an embodiment, the condition evaluation logic 120 tracks PEI transmission rate (any PEI) (e.g., as previously described). If this rate is less than a PEI transmission rate threshold, then the condition evaluation logic 120 causes the switch logic 115 to switch the primary receiver to the WUR 110.

In another embodiment, the condition evaluation logic 120 tracks the UE individual paging rate based on PDSCH contents (e.g., as previously described). If this rate is less than a UE individual paging rate threshold, the condition evaluation logic 120 causes the switch logic 115 to switch the primary receiver to the WUR 110.

In another embodiment, the condition evaluation logic 120 tracks the group paging rate based on paging PDCCH presence/group info (e.g., as previously described). If this rate is less than a group paging rate threshold, the condition evaluation logic 120 causes the switch logic 115 to switch the primary receiver to the WUR 110.

In another embodiment, the condition evaluation logic 120 observes PEI SS BD size or tracks actual PEI location variations in T/F. If the condition evaluation logic 120 determines the variability is less than a variability threshold, the condition evaluation logic 120 causes the switch logic 115 to switch the primary receiver to the WUR 110.

Multiple paging statistics can be tracked, and multiple alternatives may be combined when performing mode switching in either direction.

In one aspect, if the UE is anyways in synch with the NW (already has correct time- and frequency synchronization), the UE may ignore using WUR. For example, if the NW has configured very short DRX cycle leading to that the time/frequency synch never/seldom becomes stale between the DRX occasions the UE may then ignore using WUR since no extra synch procedures are then required by the main receiver for the sake of receiving/decoding the PEI contents.

Decision criteria and thresholds may be determined using the UE power or energy consumption model that is known to the UE, comparing average power/energy consumption when operating in the candidate modes according to the observed paging and PEI rates.

In an embodiment, the WUR may record prospective PEI samples. The WUR itself only performs simple element (e.g., DMRS) detection. If that is detected, the main receiver is activated (as it would be naturally done for processing upcoming synch signals in preparation for PO reception) and the recoded PEI samples are demodulated/decoded using the main receiver. The main receiver may then utilize additional PEI payload info (grouping, TRS availability, etc.) to determine whether to monitor the PO and to determine the receiver preparation sequence for the same.

The WUR method described previously detects presence of PEI transmission, e.g., by detection of PEI DMRS. It may also be possible to detect a specific PEI sequence using a sequence detector, e.g., a correlator. In one embodiment, the WUR can detect a subset of the possible PEIs (e.g., corresponding one or a few DCI bit combinations, or if PEI structure allows that some characteristics of the PEI can be obtained without full PDCCH decoding). Then, as the UE still can detect some of the contents of the PEI, or do hypothesis testing between sequences ensuring that false alarm rate can be kept low, the threshold for moving from the WUR to the main receiver can be increased, i.e., the UE can wait longer time before turning on the main receiver.

In an embodiment, negative PEI behavior is employed. In such an embodiment, the UE can skip decoding the paging PDSCH after having decoded a PEI. This scenario can be combined with previously described embodiments, but since only existence of PEI is obtained, skipping decoding of paging PDSCH with wrong paging group may lead to missed paging. To avoid missed paging, several different approaches can be used, including the following embodiments.

In one embodiment, WUR is used for negative PEI only if PEI DCI contents does not include grouping information.

In one embodiment, the UE may use WUR only when positive PEI is used and enables always main receiver when negative PEI is configured.

In one embodiment, the UE is (as described in previous section) capable of decoding parts of PEI contents with WUR. In addition, the grouping is here included in the part of PEI DCI that can be decoded by the UE so skipping the paging PDSCH decoding is only done for the correct group (s), thereby not introducing missed paging.

In one embodiment, the UE may skip the paging PDSCH decoding even though it was not sure that the correct grouping information was provided. As this may introduce missed paging, it is only applied after the UE has estimated that the probability of introducing paging misses is low (e.g., by inspection of previous PEI contents obtained with the full receiver).

Figure 4:
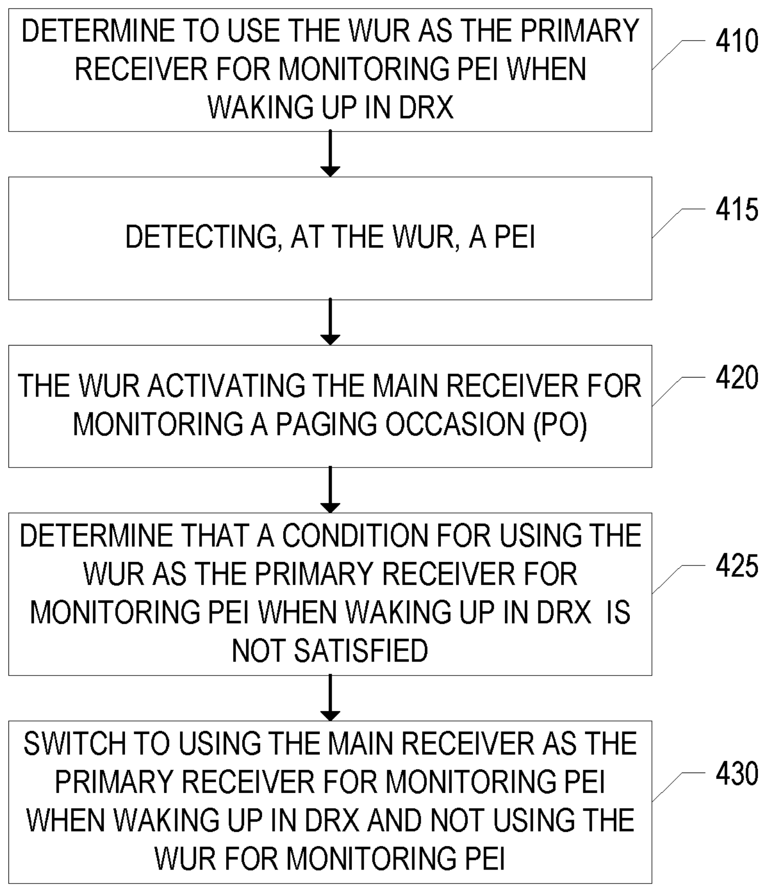
FIG. 4 is a flow diagram that illustrates exemplary operations performed by a UE for efficient usage of a main receiver and a WUR for PEI reception according to an embodiment.

FIG. 4 is a flow diagram that illustrates exemplary operations performed by a UE for efficient usage of a main receiver and a WUR for PEI reception according to an embodiment. At operation 410, the UE determines to use the WUR 110 as the primary receiver for monitoring PEI when waking up in DRX. The WUR 110 consumes less power than the main receiver 105. The WUR 110 may not be capable of decoding contents of the PEI. The decision may be made based on one or more conditions. The decision may be made through the condition evaluation logic 120 that receives input from the main receiver 105 and/or the WUR 110. The condition evaluation logic 120 can determine the following based on input from the main receiver 105 and/or the WUR 110, which can be used as condition(s) when determining which receiver to use as the primary receiver for monitoring PEI when waking up in DRX: group paging rate, UE specific paging rate, PEI rate, false paging rate, the latency constraint, the quality of the channel (e.g., RSRP, RSRQ, or SINR), or any combination thereof. In one example, the condition evaluation logic 120 determines to use the second receiver, WUR 110, as the primary receiver when waking up in DRX if the channel quality (e.g., SINR), is above a channel quality threshold (e.g., 0 dB). Alternately, or in conjunction with tracking the first threshold, the UE 100 only uses the second receiver (WUR 110) as the primary receiver where the false alarm rate is below a second false alarm threshold (e.g., 1%), where a false alarm is where the WUR 110 falsely detects presence of PEI and activates the main receiver even though there is no paging message at an upcoming paging occasion.

Next, at operation 415, the WUR 110 detects PEI when operating as the primary receiver. Detecting PEI at the WUR 110 may include determining a presence of a specific Demodulation Reference Signal (DMRS) associated with the UE that is a Downlink Control Information (DCI) included on the Physical Downlink Control Channel (PDCCH).

Next, at operation 420, the WUR 110 activates (e.g., wakes) the main receiver 105 for monitoring the PO. The received PEI may be recorded and fed to the main receiver 105 after activating the main receiver 105. The main receiver 105 demodulates the received PEI. If the demodulated PEI indicates no paging for the UE, the paging occasion may be ignored.

Next, at operation 425, the UE 100 (e.g., through the condition evaluation logic 120) determines that a condition for using the WUR 110 as the primary receiver for monitoring PEI when waking up in DRX is not satisfied. If the condition is not satisfied, the UE 100) uses the first receiver, main receiver 105, to detect/decode PEI. Thus, the WUR 110 is used as the primary receiver for monitoring PEI when waking up in DRX under certain circumstance(s)/condition (s); otherwise the main receiver 105 is used as the primary receiver for monitoring PEI when waking up in DRX. The condition evaluation logic 120 can determine condition criteria based on input from the main receiver 105 and/or the WUR 110 (e.g., group paging rate, UE specific paging rate, PEI rate, false paging rate, latency constraint, and/or quality of channel), and determine how those condition criteria are used/applied when determining which of the main receiver 105 and the WUR 110 to set as the primary receiver for monitoring PEI when waking up in DRX. The condition evaluation logic may determine a subset of the criteria, their priority/order, the thresholds used, or any combination thereof. In an embodiment, the condition evaluation logic 120 adjusts one or more thresholds for the condition based on information included in the PEI. The information may include one or more of paging sub-group information and Tracking Reference Signal (TRS) presence information.

Next, at operation 430, the UE 100 switches to using the main receiver 105 as the primary receiver for monitoring PEI when waking up in DRX and not using the WUR for monitoring PEI. For example, the condition evaluation logic 120 causes the switch logic 115 to switch the primary receiver to the main receiver 105. While the main receiver 105 is the primary receiver for monitoring PEI when waking up in DRX, the UE 100 may determine that a condition for using the WUR 110 as the primary receiver for monitoring PEI when waking up in DRX is satisfied, and responsive to that determination, switch to using the WUR 110 as the primary receiver.

Figure 5:
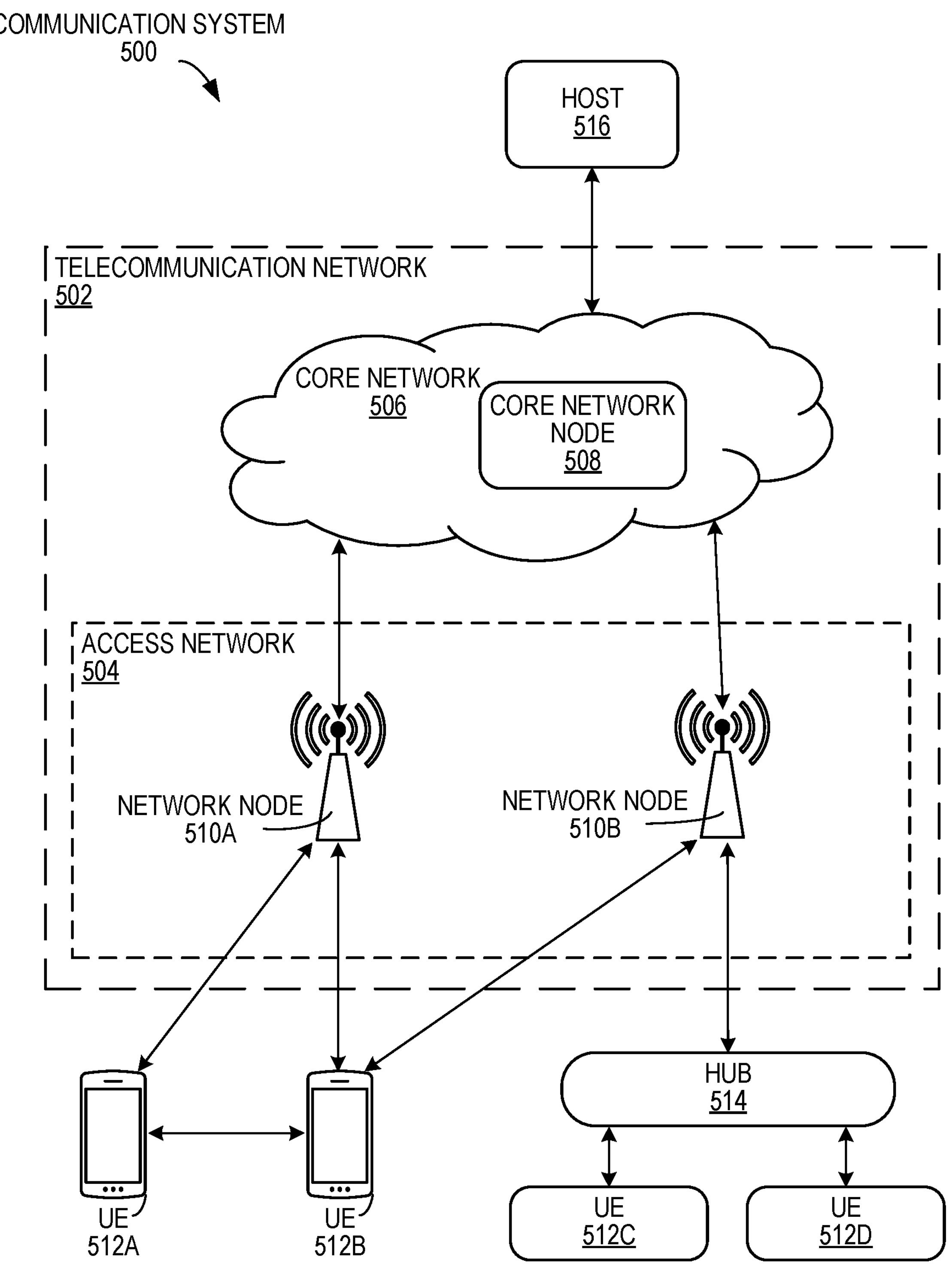
FIG. 5 shows an example of a communication system in accordance with some embodiments.

FIG. 5 shows an example of a communication system 500 in accordance with some embodiments.

In the example, the communication system 500 includes a telecommunication network 502 that includes an access network 504, such as a radio access network (RAN), and a core network 506, which includes one or more core network nodes 508. The access network 504 includes one or more access network nodes, such as network nodes 510*a* and 510*b* (one or more of which may be generally referred to as network nodes 510), or any other similar $3^{rd}$ Generation Partnership Project (3GPP) access node or non-3GPP access point. The network nodes 510 facilitate direct or indirect connection of user equipment (UE), such as by connecting UEs 512*a*, 512*b*, 512*c*, and 512*d* (one or more of which may be generally referred to as UEs 512) to the core network 506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 500 may include any number of wired or wireless networks, network nodes, UEs, and/or any other components or systems that may facilitate or participate in the communication of data and/or signals whether via wired or wireless connections. The communication system 500 may include and/or interface with any type of communication, telecommunication, data, cellular, radio network, and/or other similar type of system.

The UEs 512 may be any of a wide variety of communication devices, including wireless devices arranged, configured, and/or operable to communicate wirelessly with the network nodes 510 and other communication devices. Similarly, the network nodes 510 are arranged, capable, configured, and/or operable to communicate directly or indirectly with the UEs 512 and/or with other network nodes or equipment in the telecommunication network 502 to enable and/or provide network access, such as wireless network access, and/or to perform other functions, such as administration in the telecommunication network 502.

In the depicted example, the core network 506 connects the network nodes 510 to one or more hosts, such as host 516. These connections may be direct or indirect via one or more intermediary networks or devices. In other examples, network nodes may be directly coupled to hosts. The core network 506 includes one more core network nodes (e.g., core network node 508) that are structured with hardware and software components. Features of these components may be substantially like those described with respect to the UEs, network nodes, and/or hosts, such that the descriptions thereof are generally applicable to the corresponding components of the core network node 508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 516 may be under the ownership or control of a service provider other than an operator or provider of the access network 504 and/or the telecommunication network 502, and may be operated by the service provider or on behalf of the service provider. The host 516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

The communication system 500 of FIG. 5 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 502 is a cellular network that implements 3GPP standardized features. Accordingly, the telecommunications network 502 may support network slicing to provide different logical networks to different devices that are connected to the telecommunication network 502. For example, the telecommunications network 502 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 512 are configured to transmit and/or receive information without direct human interaction. For instance, a UE may be designed to transmit information to the access network 504 on a predetermined schedule, when triggered by an internal or external event, or in response to requests from the access network 504. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 514 communicates with the access network 504 to facilitate indirect communication between one or more UEs (e.g., UE 512*c* and/or 512*d*) and network nodes (e.g., network node 510*b*). In some examples, the hub 514 may be a controller, router, content source and analytics, or any of the other communication devices described herein regarding UEs. For example, the hub 514 may be a broadband router enabling access to the core network 506 for the UEs. As another example, the hub 514 may be a controller that sends commands or instructions to one or more actuators in the UEs. Commands or instructions may be received from the UEs, network nodes 510, or by executable code, script, process, or other instructions in the hub 514. As another example, the hub 514 may be a data collector that acts as temporary storage for UE data and, in some embodiments, may perform analysis or other processing of the data. As another example, the hub 514 may be a content source. For example, for a UE that is a VR headset, display, loudspeaker or other media delivery device, the hub 514 may retrieve VR assets, video, audio, or other media or data related to sensory information via a network node, which the hub 514 then provides to the UE either directly, after performing local processing, and/or after adding additional local content. In still another example, the hub 514 acts as a proxy server or orchestrator for the UEs, in particular if one or more of the UEs are low energy IoT devices.

The hub 514 may have a constant/persistent or intermittent connection to the network node 510*b*. The hub 514 may also allow for a different communication scheme and/or schedule between the hub 514 and UEs (e.g., UE 512*c* and/or 512*d*), and between the hub 514 and the core network 506. In other examples, the hub 514 is connected to the core network 506 and/or one or more UEs via a wired connection. Moreover, the hub 514 may be configured to connect to an M2M service provider over the access network 504 and/or to another UE over a direct connection. In some scenarios, UEs may establish a wireless connection with the network nodes 510 while still connected via the hub 514 via a wired or wireless connection. In some embodiments, the hub 514 may be a dedicated hub—that is, a hub whose primary function is to route communications to/from the UEs from/to the network node 510*b*. In other embodiments, the hub 514 may be a non-dedicated hub—that is, a device which is capable of operating to route communications between the UEs and network node 510*b*, but which is additionally capable of operating as a communication start and/or end point for certain data channels.

Figure 6:
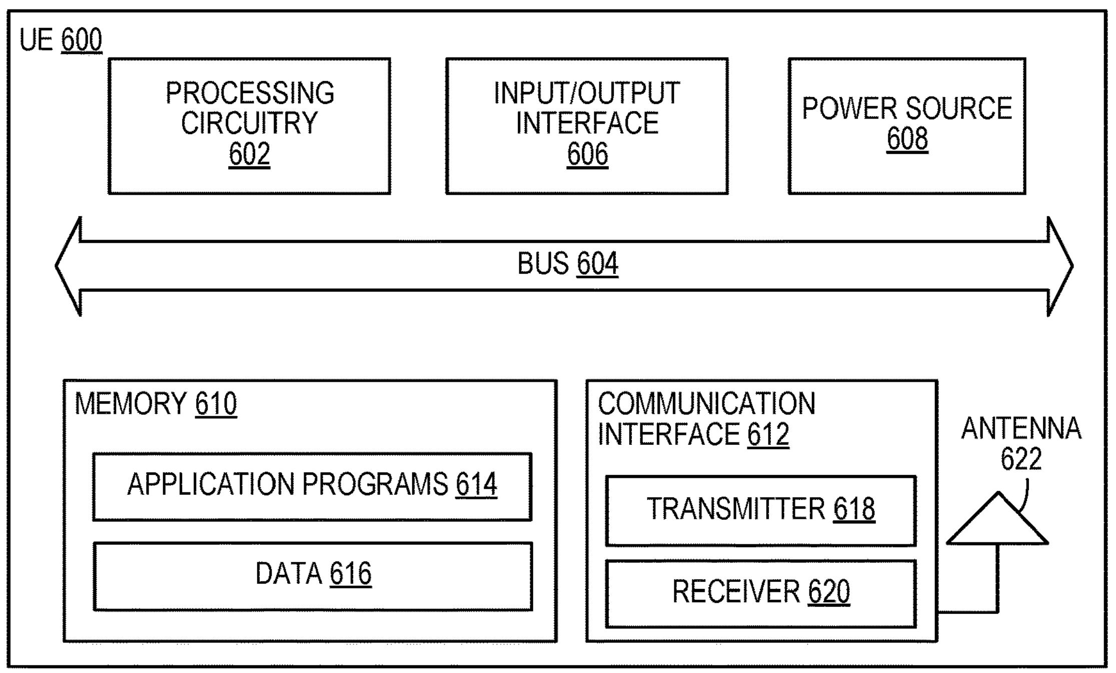
FIG. 6 shows a UE in accordance with some embodiments

FIG. 6 shows a UE 600 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 600 includes processing circuitry 602 that is operatively coupled via a bus 604 to an input/output interface 606, a power source 608, a memory 610, a communication interface 612, and/or any other component, or any combination thereof. Certain UEs may utilize all or a subset of the components shown in FIG. 6. The level of integration between the components may vary from one UE to another UE. Further, certain UEs may contain multiple instances of a component, such as multiple processors, memories, transceivers, transmitters, receivers, etc.

The processing circuitry 602 is configured to process instructions and data and may be configured to implement any sequential state machine operative to execute instructions stored as machine-readable computer programs in the memory 610. The processing circuitry 602 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 602 may include multiple central processing units (CPUs). As an example, the processing circuitry 602 may include an MCU or MPU that hosts the switch logic 115. The processing circuitry 602 may execute instructions to implement the condition evaluation logic 120.

In the example, the input/output interface 606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 608 is structured as a battery or battery pack. Other types of power sources, such as an external power source (e.g., an electricity outlet), photovoltaic device, or power cell, may be used. The power source 608 may further include power circuitry for delivering power from the power source 608 itself, and/or an external power source, to the various parts of the UE 600 via input circuitry or an interface such as an electrical power cable. Delivering power may be, for example, for charging of the power source 608. Power circuitry may perform any formatting, converting, or other modification to the power from the power source 608 to make the power suitable for the respective components of the UE 600 to which power is supplied.

The memory 610 may be or be configured to include memory such as random-access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 610 includes one or more application programs 614, such as an operating system, web browser application, a widget, gadget engine, or other application, and corresponding data 616. The memory 610 may store, for use by the UE 600, any of a variety of various operating systems or combinations of operating systems. For example, the memory 610 may include a program for the condition evaluation logic 120.

The memory 610 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 610 may allow the UE 600 to access instructions, application programs and the like, stored on transitory or non-transitory memory media, to off-load data, or to upload data. An article of manufacture, such as one utilizing a communication system may be tangibly embodied as or in the memory 610, which may be or comprise a device-readable storage medium.

The processing circuitry 602 may be configured to communicate with an access network or other network using the communication interface 612. The communication interface 612 may comprise one or more communication subsystems and may include or be communicatively coupled to an antenna 622. The communication interface 612 may include one or more transceivers used to communicate, such as by communicating with one or more remote transceivers of another device capable of wireless communication (e.g., another UE or a network node in an access network). Each transceiver may include a transmitter 618 and/or a receiver 620 appropriate to provide network communications (e.g., optical, electrical, frequency allocations, and so forth). Moreover, the transmitter 618 and receiver 620 may be coupled to one or more antennas (e.g., antenna 622) and may share circuit components, software or firmware, or alternatively be implemented separately. For instance, the main receiver 105 and the WUR 110 may be part of the communication interface 612.

In the illustrated embodiment, communication functions of the communication interface 612 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 600 shown in FIG. 6.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 7:
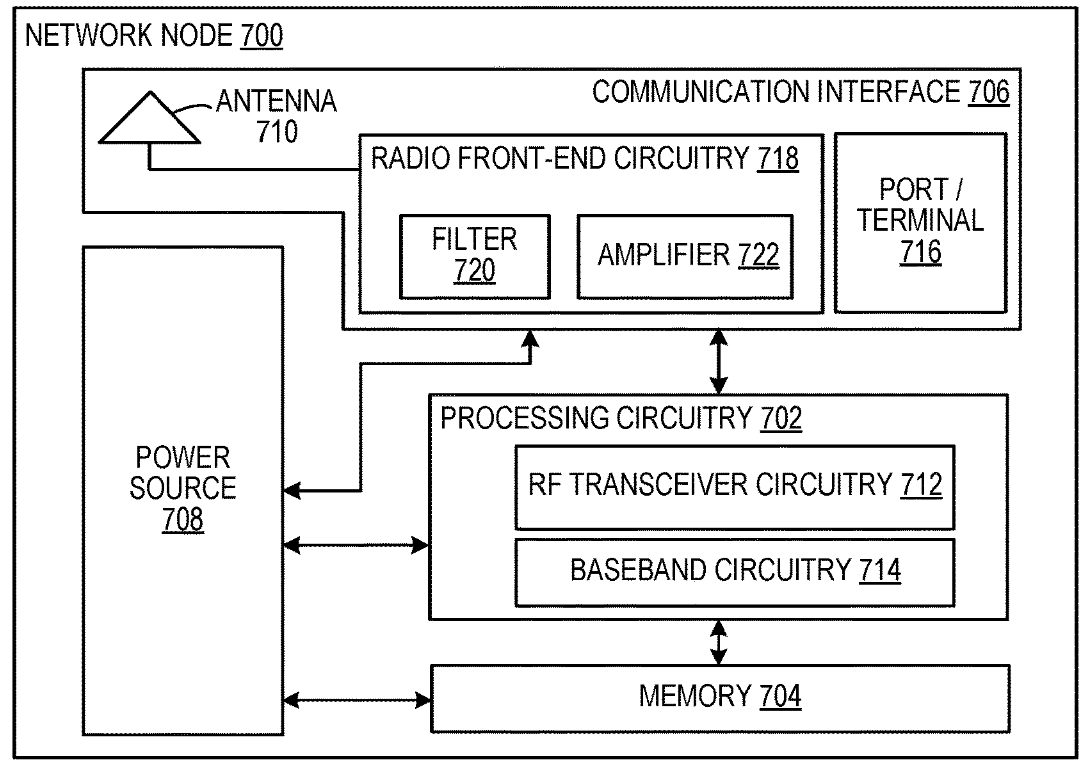
FIG. 7 shows a network node in accordance with some embodiments.

FIG. 7 shows a network node 700 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 700 includes a processing circuitry 702, a memory 704, a communication interface 706, and a power source 708. The network node 700 may be composed of multiple physically separate components (e.g., a NodeB component and a RNC component, or a BTS component and a BSC component, etc.), which may each have their own respective components. In certain scenarios in which the network node 700 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 700 may be configured to support multiple radio access technologies (RATs). In such embodiments, some components may be duplicated (e.g., separate memory 704 for different RATs) and some components may be reused (e.g., a same antenna 710 may be shared by different RATs). The network node 700 may also include multiple sets of the various illustrated components for different wireless technologies integrated into network node 700, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 700.

The processing circuitry 702 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 700 components, such as the memory 704, to provide network node 700 functionality.

In some embodiments, the processing circuitry 702 includes a system on a chip (SOC). In some embodiments, the processing circuitry 702 includes one or more of radio frequency (RF) transceiver circuitry 712 and baseband processing circuitry 714. In some embodiments, the radio frequency (RF) transceiver circuitry 712 and the baseband processing circuitry 714 may be on separate chips (or sets of chips), boards, or units, such as radio units and digital units. In alternative embodiments, part, or all of RF transceiver circuitry 712 and baseband processing circuitry 714 may be on the same chip or set of chips, boards, or units.

The memory 704 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 702. The memory 704 may store any suitable instructions, data, or information, including a computer program, software, an application including one or more of logic, rules, code, tables, and/or other instructions capable of being executed by the processing circuitry 702 and utilized by the network node 700. The memory 704 may be used to store any calculations made by the processing circuitry 702 and/or any data received via the communication interface 706. In some embodiments, the processing circuitry 702 and memory 704 is integrated.

The communication interface 706 is used in wired or wireless communication of signaling and/or data between a network node, access network, and/or UE. As illustrated, the communication interface 706 comprises port(s)/terminal(s) 716 to send and receive data, for example to and from a network over a wired connection. The communication interface 706 also includes radio front-end circuitry 718 that may be coupled to, or in certain embodiments a part of, the antenna 710. Radio front-end circuitry 718 comprises filters 720 and amplifiers 722. The radio front-end circuitry 718 may be connected to an antenna 710 and processing circuitry 702. The radio front-end circuitry may be configured to condition signals communicated between antenna 710 and processing circuitry 702. The radio front-end circuitry 718 may receive digital data that is to be sent out to other network nodes or UEs via a wireless connection. The radio front-end circuitry 718 may convert the digital data into a radio signal having the appropriate channel and bandwidth parameters using a combination of filters 720 and/or amplifiers 722. The radio signal may then be transmitted via the antenna 710. Similarly, when receiving data, the antenna 710 may collect radio signals which are then converted into digital data by the radio front-end circuitry 718. The digital data may be passed to the processing circuitry 702. In other embodiments, the communication interface may comprise different components and/or different combinations of components.

In certain alternative embodiments, the network node 700 does not include separate radio front-end circuitry 718, instead, the processing circuitry 702 includes radio front-end circuitry and is connected to the antenna 710. Similarly, in some embodiments, all, or some of the RF transceiver circuitry 712 is part of the communication interface 706. In still other embodiments, the communication interface 706 includes one or more ports or terminals 716, the radio front-end circuitry 718, and the RF transceiver circuitry 712, as part of a radio unit (not shown), and the communication interface 706 communicates with the baseband processing circuitry 714, which is part of a digital unit (not shown).

The antenna 710 may include one or more antennas, or antenna arrays, configured to send and/or receive wireless signals. The antenna 710 may be coupled to the radio front-end circuitry 718 and may be any type of antenna capable of transmitting and receiving data and/or signals wirelessly. In certain embodiments, the antenna 710 is separate from the network node 700 and connectable to the network node 700 through an interface or port.

The antenna 710, communication interface 706, and/or the processing circuitry 702 may be configured to perform any receiving operations and/or certain obtaining operations described herein as being performed by the network node. Any information, data and/or signals may be received from a UE, another network node and/or any other network equipment. Similarly, the antenna 710, the communication interface 706, and/or the processing circuitry 702 may be configured to perform any transmitting operations described herein as being performed by the network node. Any information, data and/or signals may be transmitted to a UE, another network node and/or any other network equipment.

The power source 708 provides power to the various components of network node 700 in a form suitable for the respective components (e.g., at a voltage and current level needed for each respective component). The power source 708 may further comprise, or be coupled to, power management circuitry to supply the components of the network node 700 with power for performing the functionality described herein. For example, the network node 700 may be connectable to an external power source (e.g., the power grid, an electricity outlet) via an input circuitry or interface such as an electrical cable, whereby the external power source supplies power to power circuitry of the power source 708. As a further example, the power source 708 may comprise a source of power in the form of a battery or battery pack which is connected to, or integrated in, power circuitry. The battery may provide backup power should the external power source fail.

Embodiments of the network node 700 may include additional components beyond those shown in FIG. 7 for providing certain aspects of the network node's functionality, including any of the functionality described herein and/or any functionality necessary to support the subject matter described herein. For example, the network node 700 may include user interface equipment to allow input of information into the network node 700 and to allow output of information from the network node 700. This may allow a user to perform diagnostic, maintenance, repair, and other administrative functions for the network node 700.

Figure 8:
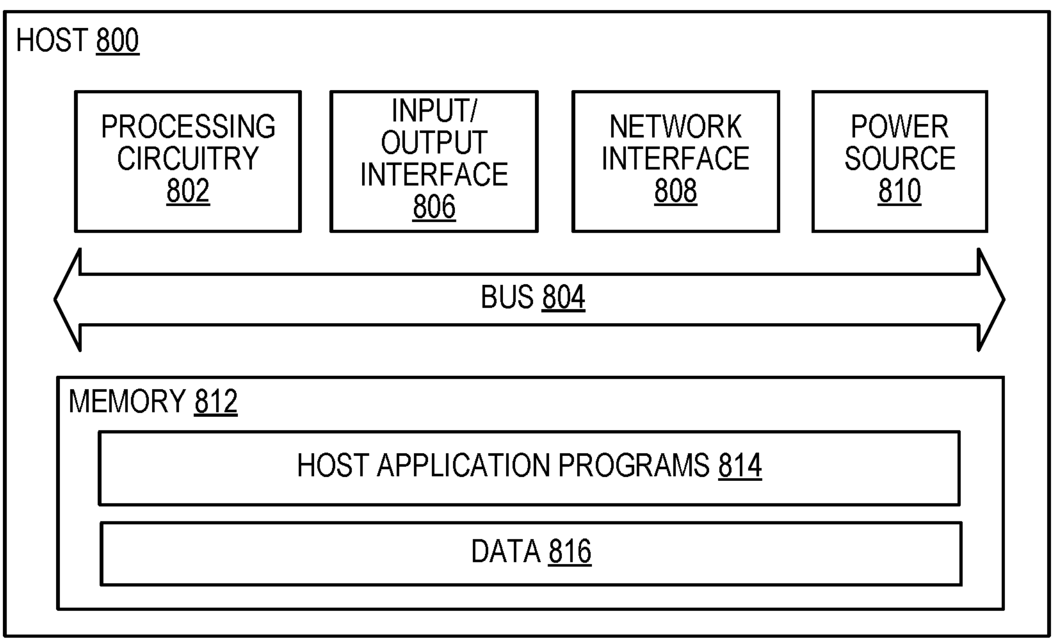
FIG. 8 is a block diagram of a host, which may be an embodiment of the host shown in FIG. 5, in accordance with various aspects described herein.

FIG. 8 is a block diagram of a host 800, which may be an embodiment of the host 516 of FIG. 5, in accordance with various aspects described herein. As used herein, the host 800 may be or comprise various combinations hardware and/or software, including a standalone server, a blade server, a cloud-implemented server, a distributed server, a virtual machine, container, or processing resources in a server farm. The host 800 may provide one or more services to one or more UEs.

The host 800 includes processing circuitry 802 that is operatively coupled via a bus 804 to an input/output interface 806, a network interface 808, a power source 810, and a memory 812. Other components may be included in other embodiments. Features of these components may be substantially like those described with respect to the devices of previous figures, such as FIGS. 6 and 7, such that the descriptions thereof are generally applicable to the corresponding components of host 800.

The memory 812 may include one or more computer programs including one or more host application programs 814 and data 816, which may include user data, e.g., data generated by a UE for the host 800 or data generated by the host 800 for a UE. Embodiments of the host 800 may utilize only a subset or all the components shown. The host application programs 814 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 814 may also provide for user authentication and licensing checks and may periodically report health, routes, and content availability to a central node, such as a device in or on the edge of a core network. Accordingly, the host 800 may select and/or indicate a different host for over-the-top services for a UE. The host application programs 814 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 9:
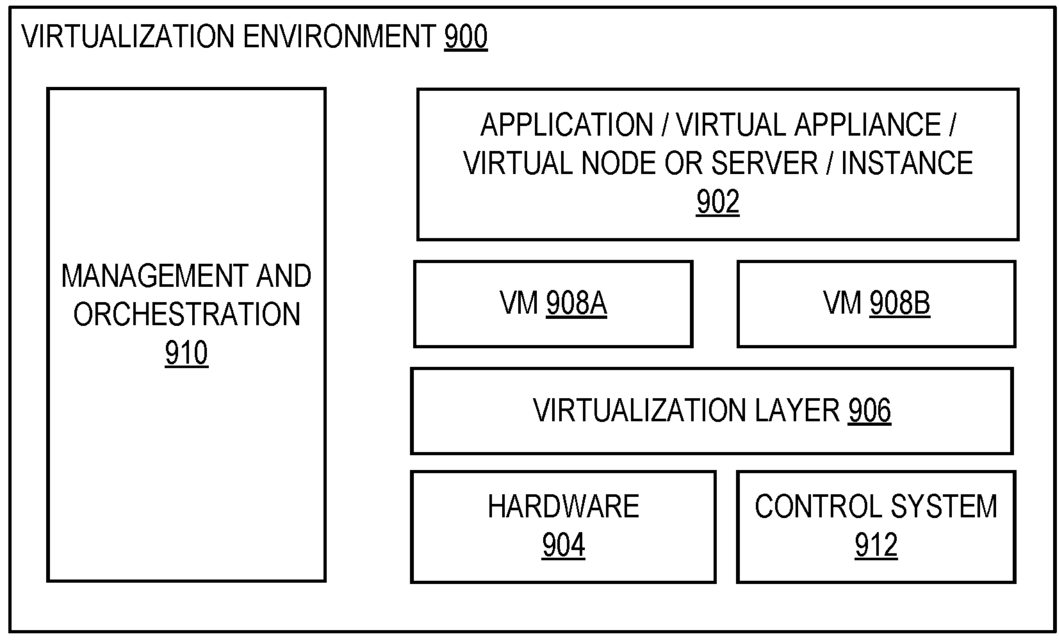
FIG. 9 is a block diagram illustrating a virtualization environment in which functions implemented by some embodiments may be virtualized.

FIG. 9 is a block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all the functions described herein may be implemented as virtual components executed by one or more virtual machines (VMs) implemented in one or more virtual environments 900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 904 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 906 (also referred to as hypervisors or virtual machine monitors (VMMs)), provide VMs 908*a* and 908*b* (one or more of which may be generally referred to as VMs 908), and/or perform any of the functions, features and/or benefits described in relation with some embodiments described herein. The virtualization layer 906 may present a virtual operating platform that appears like networking hardware to the VMs 908.

The VMs 908 comprise virtual processing, virtual memory, virtual networking or interface and virtual storage, and may be run by a corresponding virtualization layer 906. Different embodiments of the instance of a virtual appliance 902 may be implemented on one or more of VMs 908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be in data centers, and customer premise equipment.

In the context of NFV, a VM 908 may be a software implementation of a physical machine that runs programs as if they were executing on a physical, non-virtualized machine. Each of the VMs 908, and that part of hardware 904 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 908 on top of the hardware 904 and corresponds to the application 902.

Hardware 904 may be implemented in a standalone network node with generic or specific components. Hardware 904 may implement some functions via virtualization. Alternatively, hardware 904 may be part of a larger cluster of hardware (e.g. such as in a data center or CPE) where many hardware nodes work together and are managed via management and orchestration 910, which, among others, oversees lifecycle management of applications 902. In some embodiments, hardware 904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 912 which may alternatively be used for communication between hardware nodes and radio units.

Figure 10:
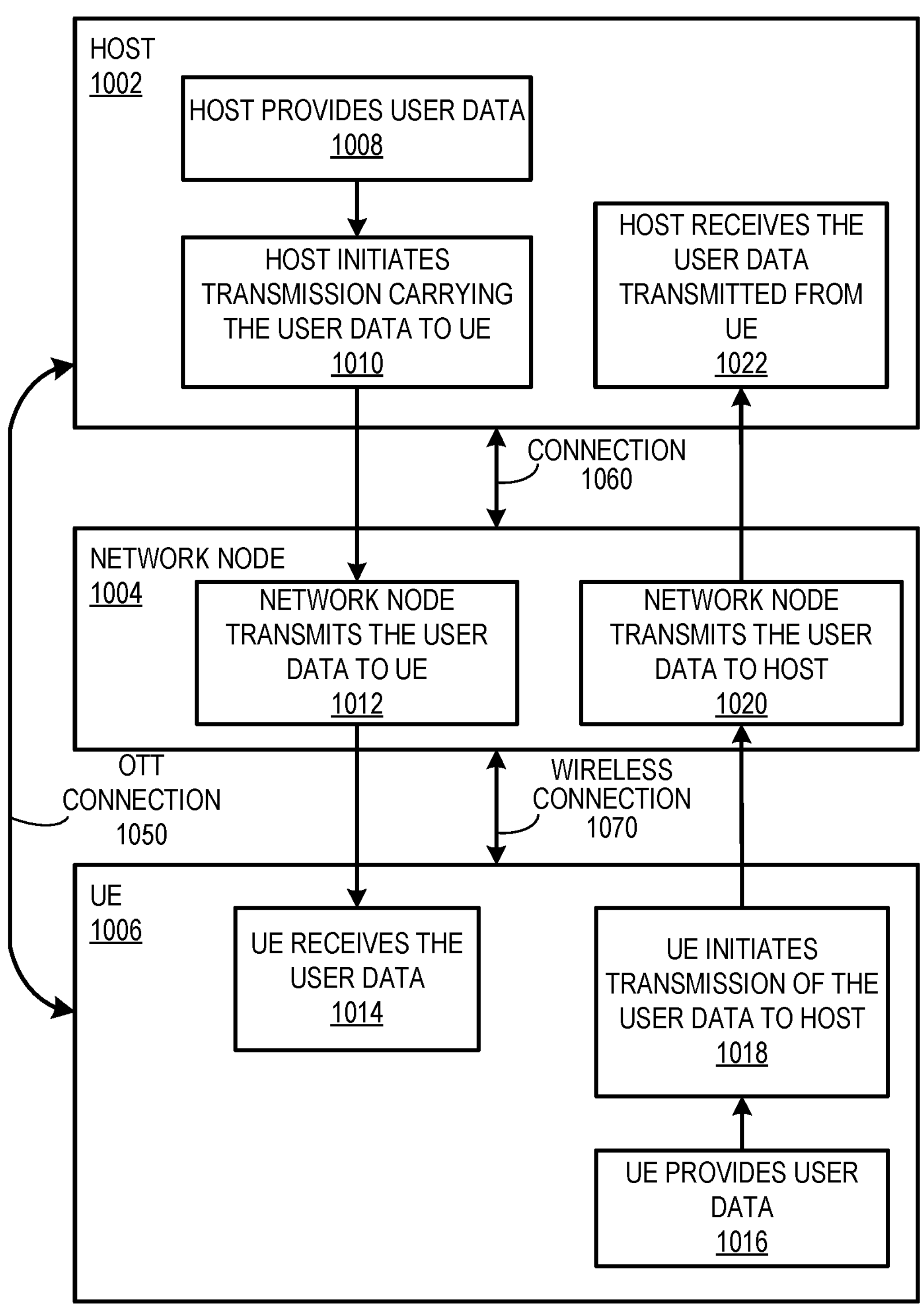
FIG. 10 shows a communication diagram of a host communicating via a network node with a UE over a partially wireless connection in accordance with some embodiments

FIG. 10 shows a communication diagram of a host 1002 communicating via a network node 1004 with a UE 1006 over a partially wireless connection in accordance with some embodiments. Example implementations, in accordance with various embodiments, of the UE (such as a UE 512*a* of FIG. 5 and/or UE 600 of FIG. 6), network node (such as network node 510*a* of FIG. 5 and/or network node 700 of FIG. 7), and host (such as host 516 of FIG. 5 and/or host 800 of FIG. 8) discussed in the preceding paragraphs will now be described with reference to FIG. 10.

Like host 800, embodiments of host 1002 include hardware, such as a communication interface, processing circuitry, and memory. The host 1002 also includes software, which is stored in or accessible by the host 1002 and executable by the processing circuitry. The software includes a host application that may be operable to provide a service to a remote user, such as the UE 1006 connecting via an over-the-top (OTT) connection 1050 extending between the UE 1006 and host 1002. In providing the service to the remote user, a host application may provide user data which is transmitted using the OTT connection 1050.

The network node 1004 includes hardware enabling it to communicate with the host 1002 and UE 1006. The connection 1060 may be direct or pass through a core network (like core network 506 of FIG. 5) and/or one or more other intermediate networks, such as one or more public, private, or hosted networks. For example, an intermediate network may be a backbone network or the Internet.

The UE 1006 includes hardware and software, which is stored in or accessible by UE 1006 and executable by the UE's processing circuitry. The software includes a client application, such as a web browser or operator-specific "app" that may be operable to provide a service to a human or non-human user via UE 1006 with the support of the host 1002. In the host 1002, an executing host application may communicate with the executing client application via the OTT connection 1050 terminating at the UE 1006 and host 1002. In providing the service to the user, the UE's client application may receive request data from the host's host application and provide user data in response to the request data. The OTT connection 1050 may transfer both the request data and the user data. The UE's client application may interact with the user to generate the user data that it provides to the host application through the OTT connection 1050.

The OTT connection 1050 may extend via a connection 1060 between the host 1002 and the network node 1004 and via a wireless connection 1070 between the network node 1004 and the UE 1006 to provide the connection between the host 1002 and the UE 1006. The connection 1060 and wireless connection 1070, over which the OTT connection 1050 may be provided, have been drawn abstractly to illustrate the communication between the host 1002 and the UE 1006 via the network node 1004, without explicit reference to any intermediary devices and the precise routing of messages via these devices.

As an example of transmitting data via the OTT connection 1050, in step 1008, the host 1002 provides user data, which may be performed by executing a host application. In some embodiments, the user data is associated with a particular human user interacting with the UE 1006. In other embodiments, the user data is associated with a UE 1006 that shares data with the host 1002 without explicit human interaction. In step 1010, the host 1002 initiates a transmission carrying the user data towards the UE 1006. The host 1002 may initiate the transmission responsive to a request transmitted by the UE 1006. The request may be caused by human interaction with the UE 1006 or by operation of the client application executing on the UE 1006. The transmission may pass via the network node 1004, in accordance with the teachings of the embodiments described throughout this disclosure. Accordingly, in step 1012, the network node 1004 transmits to the UE 1006 the user data that was carried in the transmission that the host 1002 initiated, in accordance with the teachings of the embodiments described throughout this disclosure. In step 1014, the UE 1006 receives the user data carried in the transmission, which may be performed by a client application executed on the UE 1006 associated with the host application executed by the host 1002.

In some examples, the UE 1006 executes a client application which provides user data to the host 1002. The user data may be provided in reaction or response to the data received from the host 1002. Accordingly, in step 1016, the UE 1006 may provide user data, which may be performed by executing the client application. In providing the user data, the client application may further consider user input received from the user via an input/output interface of the UE 1006. Regardless of the specific way the user data was provided, the UE 1006 initiates, in step 1018, transmission of the user data towards the host 1002 via the network node 1004. In step 1020, in accordance with the teachings of the embodiments described throughout this disclosure, the network node 1004 receives user data from the UE 1006 and initiates transmission of the received user data towards the host 1002. In step 1022, the host 1002 receives the user data carried in the transmission initiated by the UE 1006.

One or more of the various embodiments improve the performance of OTT services provided to the UE 1006 using the OTT connection 1050, in which the wireless connection 1070 forms the last segment. More precisely, the teachings of these embodiments may improve the energy savings for UEs equipped with lower power receivers and thereby extend battery life.

In an example scenario, factory status information may be collected and analyzed by the host 1002. As another example, the host 1002 may process audio and video data which may have been retrieved from a UE for use in creating maps. As another example, the host 1002 may collect and analyze real-time data to assist in controlling vehicle congestion (e.g., controlling traffic lights). As another example, the host 1002 may store surveillance video uploaded by a UE. As another example, the host 1002 may store or control access to media content such as video, audio, VR or AR which it can broadcast, multicast or unicast to UEs. As other examples, the host 1002 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency, and other factors on which the one or more embodiments improve. There may further be an optional network functionality for reconfiguring the OTT connection 1050 between the host 1002 and UE 1006, in response to variations in the measurement results. The measurement procedure and/or the network functionality for reconfiguring the OTT connection may be implemented in software and hardware of the host 1002 and/or UE 1006. In some embodiments, sensors (not shown) may be deployed in or in association with other devices through which the OTT connection 1050 passes; the sensors may participate in the measurement procedure by supplying values of the monitored quantities exemplified above, or supplying values of other physical quantities from which software may compute or estimate the monitored quantities. The reconfiguring of the OTT connection 1050 may include message format, retransmission settings, preferred routing etc.; the reconfiguring need not directly alter the operation of the network node 1004. Such procedures and functionalities may be known and practiced in the art. In certain embodiments, measurements may involve proprietary UE signaling that facilitates measurements of throughput, propagation times, latency, and the like, by the host 1002. The measurements may be implemented in that software causes messages to be transmitted, in particular empty or 'dummy' messages, using the OTT connection 1050 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining or similar operations described herein may be performed by processing circuitry, which may process information by, for example, converting the obtained information into other information, comparing the obtained information, or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Group A Embodiments

1. A method performed by a user equipment (UE) for efficient usage of a main receiver and a wake-up receiver (WUR) for paging-early-indication (PEI) reception, the method comprising:

determining to use the WUR as a primary receiver for monitoring PEI when waking up in Discontinuous Reception (DRX);

detecting, at the WUR, a PEI;

responsive to the detecting the PEI, the WUR activating the main receiver for monitoring a paging occasion (PO);

determining that a condition for using the WUR as the primary receiver for monitoring PEI when waking up in DRX is not satisfied; and responsive to the determining that the condition for using the WUR as the primary receiver for monitoring PEI when waking up in DRX is not satisfied, switching to using the main receiver as the primary receiver for monitoring PEI when waking up in DRX and not using the WUR for monitoring PEI.

2. The method of 1, further comprising:

adjusting one or more thresholds for the condition based on information included in the PEI.

3. The method of 2, wherein the information includes one or more of paging sub-group information and Tracking Reference Signal (TRS) presence information.

4. The method of any of the previous embodiments, further comprising:

recording the received PEI and feeding the received PEI to the main receiver after activating the main receiver, wherein the main receiver demodulates the received PEI.

5. The method of 4, further comprising: determining that the demodulated PEI indicates no paging for the UE, and responsive to this determination, ignoring decoding the paging occasion.

6. The method of any of the previous embodiments, further comprising:

while the main receiver is the primary receiver for monitoring PEI when waking up in DRX, determining that a condition for using the WUR as the primary receiver for monitoring PEI when waking up in DRX is satisfied, and responsive to this determination, switching to using the WUR as the primary receiver.

7. The method of any of the previous embodiments, wherein the condition is based on at least one of a group paging rate, UE specific paging rate, PEI rate, false paging rate, latency constraint, quality of the channel, or any combination thereof.

8. The method of any of the previous embodiments, wherein determining to use the WUR as the primary receiver for monitoring PEI when waking up in DRX is based on channel quality being greater than a channel quality threshold.

9. The method of any of the previous embodiments, wherein determining to use the WUR as the primary receiver for monitoring PEI when waking up in DRX is where a false alarm rate is below a false alarm rate threshold, wherein a false alarm is where the WUR falsely detects presence of PEI and activates the main receiver even though there is no paging message at an upcoming paging occasion.

10. The method of any of the previous embodiments, wherein the WUR consumes less power than the main receiver.

11. The method of any of the previous embodiments, wherein the step of detecting, at the WUR, the PEI includes determining a presence of a specific Demodulation Reference Signal (DMRS) associated with the UE that is a Downlink Control Information (DCI) included on the Physical Downlink Control Channel (PDCCH).

12. The method of any of the previous embodiments, wherein the WUR is not capable of decoding contents of the PEI.

Group B Embodiments

13. A user equipment for efficient usage of a main receiver and a wake-up receiver (WUR) for paging-early-indication (PEI) reception, comprising:

processing circuitry configured to perform any of the steps of any of the Group A embodiments; and power supply circuitry configured to supply power to the processing circuitry.

14. A user equipment (UE) for efficient usage of a main receiver and a wake-up receiver (WUR) for paging-early-indication (PEI) reception, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

What is claimed is:

1. A method performed by a user equipment (UE) for efficient usage of a main receiver and a wake-up receiver (WUR) for paging-early-indication (PEI) reception, the method comprising:

determining to use the WUR as a primary receiver for monitoring PEI when waking up in Discontinuous Reception (DRX), wherein the WUR consumes less power than the main receiver;

detecting, at the WUR, a PEI;

responsive to the detecting the PEI, the WUR activating the main receiver for monitoring a paging occasion (PO); and determining that a condition for using the WUR as the primary receiver for monitoring PEI when waking up in DRX is not satisfied and, in response, switching to using the main receiver as the primary receiver for monitoring PEI when waking up in DRX and not using the WUR for monitoring PEI;

wherein determining to use the WUR as the primary receiver for monitoring PEI when waking up in DRX is where a false alarm rate is below a false alarm rate threshold, wherein a false alarm is where the WUR falsely detects presence of PEI and activates the main receiver even though there is no paging message at an upcoming paging occasion.

2. The method of claim 1, further comprising:

adjusting one or more thresholds for the condition based on information included in the PEI.

3. The method of claim 2, wherein the information includes one or more of paging sub-group information and Tracking Reference Signal (TRS) presence information.

4. The method of claim 1, further comprising:

recording the received PEI and feeding the received PEI to the main receiver after activating the main receiver, wherein the main receiver demodulates the received PEI.

5. The method of claim 4, further comprising:

determining that the demodulated PEI indicates no paging for the UE, and responsive to this determination, ignoring decoding the paging occasion.

6. The method of claim 1, further comprising:

while the main receiver is the primary receiver for monitoring PEI when waking up in DRX, determining that a condition for using the WUR as the primary receiver for monitoring PEI when waking up in DRX is satisfied, and responsive to this determination, switching to using the WUR as the primary receiver.

7. The method of claim 1, wherein the condition is based on at least one of a group paging rate, UE specific paging rate, PEI rate, false paging rate, latency constraint, quality of the channel, or any combination thereof.

8. The method of claim 1, wherein determining to use the WUR as the primary receiver for monitoring PEI when waking up in DRX is further based on channel quality being greater than a channel quality threshold.

9. The method of claim 1, wherein the step of detecting, at the WUR, the PEI includes determining a presence of a specific Demodulation Reference Signal (DMRS) associated with the UE that is a Downlink Control Information (DCI) included on a Physical Downlink Control Channel (PDCCH).

10. The method of claim 1, wherein the WUR is not capable of decoding contents of the PEI.

11. A user equipment for efficient usage of a main receiver and a wake-up receiver (WUR) for paging-early-indication (PEI) reception, the user equipment comprising:

power supply circuitry; and processing circuitry powered via the power supply circuitry and configured to determine to use the WUR as a primary receiver for monitoring PEI when waking up in Discontinuous Reception (DRX), wherein the WUR consumes less power than the main receiver;

wherein, responsive to detection of a PEI by the WUR, the WUR activates the main receiver for monitoring a paging occasion (PO), and, wherein the processing circuitry is further configured to:

determine that a condition for using the WUR as the primary receiver for monitoring PEI when waking up in DRX is not satisfied; and responsive to the determination that the condition for using the WUR as the primary receiver for monitoring PEI when waking up in DRX is not satisfied, switch to using the main receiver as the primary receiver for monitoring PEI when waking up in DRX and not using the WUR for monitoring PEI;

wherein the processing circuitry is configured to determine to use the WUR as the primary receiver for monitoring PEI when waking up in DRX where a false alarm rate is below a false alarm rate threshold, wherein a false alarm is where the WUR falsely detects presence of PEI and activates the main receiver even though there is no paging message at an upcoming paging occasion.

12. A user equipment (UE) for efficient usage of a main receiver and a wake-up receiver (WUR) for paging-early-indication (PEI) reception, the UE comprising:

a processor; and a non-transitory computer-readable storage medium that provides instructions that, when executed by the processor, cause the UE to:

determine to use the WUR as a primary receiver for monitoring PEI when waking up in Discontinuous Reception (DRX), wherein the WUR consumes less power than the main receiver, and wherein, responsive to detection of a PEI by the WUR, the WUR activates the main receiver for monitoring a paging occasion (PO); and determine that a condition for using the WUR as the primary receiver for monitoring PEI when waking up in DRX is not satisfied and, in response, switch to using the main receiver as the primary receiver for monitoring PEI when waking up in DRX and not using the WUR for monitoring PEI;

wherein the UE determines to use the WUR as the primary receiver for monitoring PEI when waking up in DRX where a false alarm rate is below a false alarm rate threshold, wherein a false alarm is where the WUR falsely detects presence of PEI and activates the main receiver even though there is no paging message at an upcoming paging occasion.

* * * * *